US006638586B2

(12) United States Patent
Liau

(10) Patent No.: US 6,638,586 B2
(45) Date of Patent: Oct. 28, 2003

(54) STRUCTURE OF A BALLOON SUITABLE FOR INK JET PRINTING

(76) Inventor: Ting Chau Liau, PO Box 82-144, Taipei (TW)

( * ) Notice: Subject to any disclaimer, the term of this patent is extended or adjusted under 35 U.S.C. 154(b) by 107 days.

(21) Appl. No.: 09/931,746

(22) Filed: Aug. 20, 2001

(65) Prior Publication Data

US 2003/0035909 A1 Feb. 20, 2003

(51) Int. Cl.[7] ........................ C08F 26/08; C08F 220/12; C09D 133/00

(52) U.S. Cl. ........................ 428/34.3; 428/486; 428/518

(58) Field of Search ............................... 428/35.4, 36.6, 428/40.1, 40.5, 41.3, 41.8, 42.1, 42.3, 518, 34.3, 486; 446/220

(56) References Cited

U.S. PATENT DOCUMENTS 4,550,053 A * 10/1985 Arai et al. ............... 428/304.4
6,197,409 B1 * 3/2001 Bodager et al. ............ 428/212

* cited by examiner

*Primary Examiner*—Sandra M. Nolan
(74) *Attorney, Agent, or Firm*—Leong C. Lei

(57) ABSTRACT

An improved structure of a balloon suitable for inkjet printing devices is disclosed. The balloon structure of inkjet printing comprises: a vinyl resin layer (EVOH/ethylene and vinyl alcohol copolymer resin); a linear polyethylene layer (LLDPE) combined with the vinyl resin layer to form a base material; an ink-absorbing layer coated onto a side surface of the base material facilitating the absorption of ink from an inkjet printing device to form into patterns/characters; and a soft pad layer being a thin body having a side surface coated with a glue layer which can be easily removed for adhesion onto the other side surface of the base material to increase the thickness of the base material which can be delivered by the inkjet printing device. The inkjet printing device prints words, patterns onto the ink-absorbing layer. The soft pad layer is then removed, and by means of the hot sealing, and cutting steps, specific character, patterns, drawings are printed onto the balloon.

1 Claim, 1 Drawing Sheet

STRUCTURE OF A BALLOON SUITABLE FOR INK JET PRINTING

BACKGROUND OF THE INVENTION (a) Field of the Invention

The present invention relates to an improved structure of a balloon suitable for inkjet printing device, and in particular, to a balloon structure in which dyes/colorations of the inkjet-printing device can be coated thereon.

(b) Description of the Prior Art

Gas such as Helium used to inflate balloon has extremely strong permeability. Therefore the material for making balloon has to be good flexibility, strength, high density and gas-resistance so as to fulfill the requirement for the large rate of gas expansion. Commonly, vinyl resin (EVOH and vinyl alcohol copolymer) is used as a base material, and in order to facilitate the fabrication process, a linear polyethylene layer is coated so as to obtain good compactness and low melting point. However, these conventional balloons only have one single color and a special ink-printing device has to be used in order to print patterns or words thereon. Thus, the cost of production of these balloons is high and the printing of words or patterns onto the balloon is laborious and difficult.

Taiwanese Patent Publication No. 406576, entitled “An Improved Structure of Balloon For Painting Thereon” discloses a balloon having at least one surface being made of a plastic film. The surface of the plastic film has cavities and a matte plastic ink is printed thereon so that the surface can be used for writing and painting. However, the surface is flexible and soft and the shape is indefinite, therefore, they are not suitable to be placed into the paper delivery chamber of the ink jet-printing device. Accordingly, it is an object of the present invention to provide an improved structure of a balloon capable of having ink jet-printing coated thereon, which mitigates the above drawbacks.

SUMMARY OF THE INVENTION

Accordingly, it is an object of the present invention to provide an improved structure of a balloon capable of having ink jet printing coated thereon comprising a vinyl resin layer (EVOH/ethylene and vinyl alcohol copolymer resin); a linear low density polyethylene layer (LLDPE) combined with the vinyl resin layer to form a base material; an ink-absorbing layer coated onto a side surface of the base material facilitating the absorption of ink from an ink jet printing device to form into patterns/characters; and a soft pad layer being a thin body having a side surface coated with a glue layer which can be easily removed for adhesion onto the other side surface of the base material to increase the thickness of the base material so as to be placed in the paper delivery chamber of the ink jet printing device which can then be delivered by the ink jet printing device. The ink jet-printing device prints words, patterns, and/or special designs onto the ink-absorbing layer. The soft pad layer is then removed, and by means of the hot sealing, and cutting steps, specific character, patterns, drawings are printed onto the balloon.

Yet another object of the present invention is to provide an improved structure of a balloon capable of having ink jet printing coated thereon, wherein the thickness of the combination of the base material and the soft pad layer is as thick as paper, this material can be made into single sheet or a stack or rolls for the need of ink jet printing device.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 1:
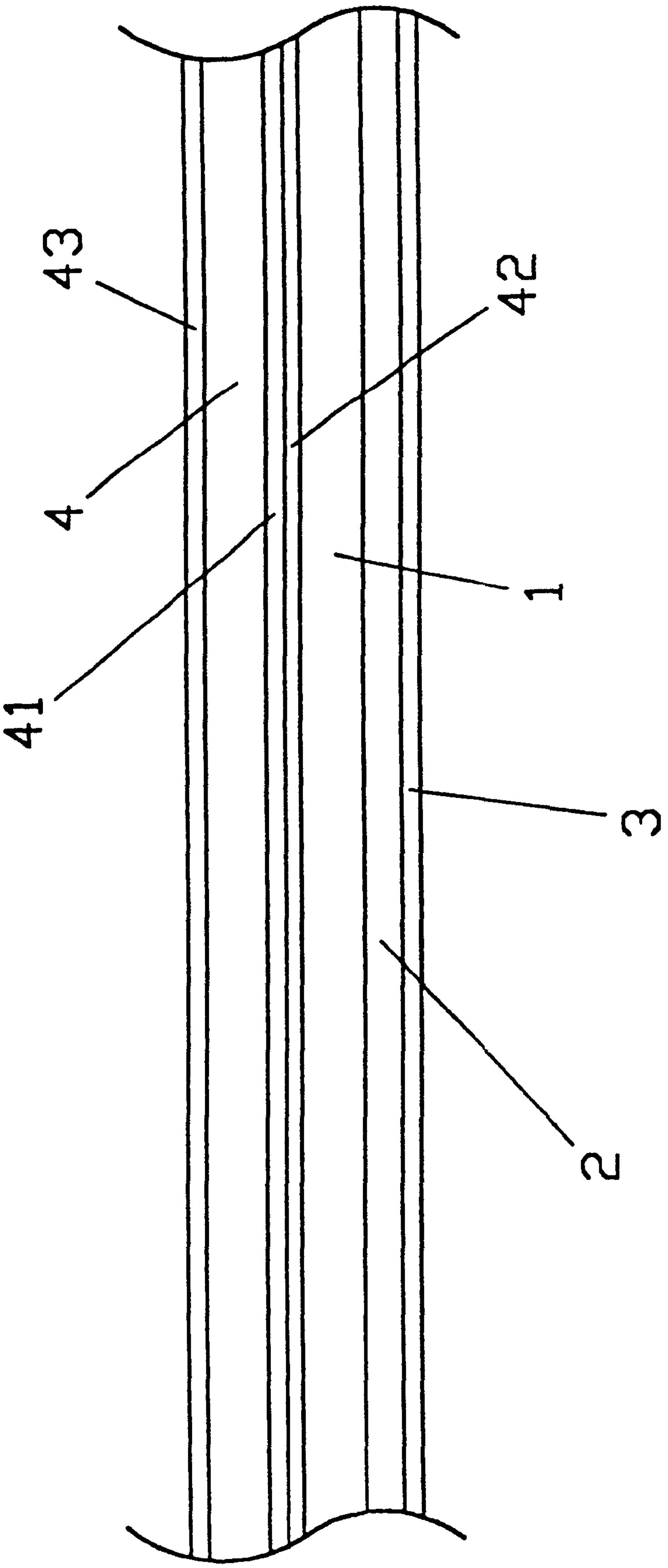
FIG. 1 is a cross-sectional view of an improved structure of a balloon capable of having ink jet-printing coated thereon according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

FIG. 1 shows the structure of the balloon in accordance with the present invention. As shown in the figure, the balloon structure comprises a vinyl resin layer 1 (EVOH/ethylene and vinyl alcohol copolymer resin), a linear low density polyethylene layer 2 and a soft pad layer 4. The vinyl resin layer 1 and the polyethylene layer 2 are combined to form a base material, and the vinyl resin material has the characteristics of transparent, good strength, excellent flexibility, good air resistance and thermal-resistance (thermal resistance to 191° C., deformation temperature 215° C. Linear polyethylene has the characteristics of low melting point (about 85° C.), and good compactness. Accordingly, their combination to form as base material provides the requirements of a balloon. One side surface of the base material is coated with an ink-absorbing layer 3 to absorb ink from the ink jet-printing device to form into words, characters or patterns. The other side surface is coated with a releasing agent 42 (for instance, wax or the like materials). The soft pad layer 4 is a thin plate body having one side lateral surface being coated with an adhesive glue layer 41 for the adhesion with the releasing agent 42, so that the thickness of the base material is suitable for use in the ink jet-printing device so that the device can deliver it. In order to avoid the base material from curling or deformation, the other lateral side of the soft pad layer 4 combined with the base material is provided with a polyethylene film 43 so as to protect the soft pad layer 4 and to keep away moisture.

In accordance with the present invention, the soft pad layer 4 can be a thin sheet of paper or moist-resistance PVC film so as to increase the thickness of the base material and to appropriately extend to support the base material. The combination of the soft pad layer 4 and the vinyl resin layer

1 and the polyethylene layer 2 has a thickness and softness as that of the paper suitable for inkjet printing device so that it can be placed within the paper delivery chamber of the inkjet printing device. Thus, the combined structure in accordance with the present invention can be packed as a roll or in stacks for the use in the inkjet-printing device.

After the words, patterns or characters are printed onto the ink-absorbing layer 3, the soft pad layer 4 can be removed and through a thermal sealing step, the linear polyethylene layer 2 is thermally sealed at about 100° C. By a cutting procedure, based on words, patterns or specific design requirements, which have been printed, appropriate balloon structure can be obtained.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A balloon structure comprising:

a vinyl resin layer;

a linear low density polyethylene layer (LLDPE) combined with the vinyl resin layer to form a base material;

an ink-absorbing layer coated onto a side surface of the base material facilitating absorption of ink from an ink jet printing device to form into patterns/characters;

a soft pad layer being a thin body having a side surface coated with a glue layer; and a releasing agent being provided between the glue layer and the base material facilitating releasing of the soft pad layer from the base material;

wherein the releasing agent is wax, the other lateral side of the soft pad layer mounted onto the base material is provided with a polyethylene film to protect the soft pad layer, and the material of the soft pad layer is a thin paper.

* * * * *